(12) United States Patent
Kermelk et al.

(10) Patent No.: US 10,124,625 B2
(45) Date of Patent: Nov. 13, 2018

(54) VEHICLE WHEEL FOR PASSENGER CARS

(71) Applicant: Maxion Wheels Germany Holding GmbH, Königswinter (DE)

(72) Inventors: Werner Kermelk, Much (DE); Karl Rode, Königswinter (DE); Günter Stelzer, Bad Honnef (DE)

(73) Assignee: MAXION WHEELS GERMANY HOLDINGS GMBH, Königswinter (DE)

( * ) Notice: Subject to any disclaimer, the term of this patent is extended or adjusted under 35 U.S.C. 154(b) by 0 days.

(21) Appl. No.: 14/440,708

(22) PCT Filed: Nov. 4, 2013

(86) PCT No.: PCT/IB2013/059879
§ 371 (c)(1),
(2) Date: May 5, 2015

(87) PCT Pub. No.: WO2014/072896
PCT Pub. Date: May 15, 2014

(65) Prior Publication Data
US 2015/0290969 A1 Oct. 15, 2015

(30) Foreign Application Priority Data

Nov. 6, 2012 (DE) .................... 20 2012 104 260 U

(51) Int. Cl.
*B60B 3/04* (2006.01)
*B60B 3/00* (2006.01)
(Continued)

(52) U.S. Cl.
CPC .................. *B60B 3/04* (2013.01); *B60B 1/10* (2013.01); *B60B 3/004* (2013.01); *B60B 3/007* (2013.01);
(Continued)

(58) Field of Classification Search
CPC ........... B60B 3/00; B60B 3/002; B60B 3/004; B60B 3/007; B60B 3/008; B60B 3/04; B60B 3/10; B60B 19/10
(Continued)

(56) References Cited

U.S. PATENT DOCUMENTS

| 1,375,372 A | 4/1921 | Forsyth |
| 4,854,646 A * | 8/1989 | Schempp ................ B60B 19/10 301/6.3 |

(Continued)

FOREIGN PATENT DOCUMENTS

| CA | 2591366 A1 | 12/2007 |
| CN | 201856562 U | 6/2011 |

(Continued)

OTHER PUBLICATIONS

PCT International Search Report, Application No. PCT/IB2013/059879 filed Nov. 4, 2013, dated Feb. 11, 2014.
(Continued)

*Primary Examiner* — Jason R Bellinger
(74) *Attorney, Agent, or Firm* — MacMillan, Sobanski & Todd, LLC

(57) ABSTRACT

A vehicle wheel e.g. for passenger cars, having a disc part connected to a rim part, the disc part, integrally formed form a sheet metal blank, has a central part with bolt holes for wheel bolts and a central hole for a vehicle hub, and a plurality of radially extending spoke arrangements for transmitting forces between the vehicle hub and the rim part. Each spoke arrangement is provided with a central web, merging on both sides into a radially extending side web, being bent outwards from the surface of the central web, and an edge web, bent back again relative to the side web, wherein the radially outer ends of the webs merge into a disc rim, being aligned parallel to the wheel axis, connecting all (Continued)

spoke arrangements to one another and delimiting ventilation holes. In order to provide, without structural drawbacks, steel vehicle wheels with an unequal number of bolt holes and spoke arrangements, an inner annular bead and an outer annular bead are formed in the central part, which beads are concentric with one another and with the disc rim, and a raised annular strip provided with the bolt holes is formed between the beads.

18 Claims, 4 Drawing Sheets

(51) Int. Cl.
*B60B 3/10* (2006.01)
*B60B 1/10* (2006.01)
*B60B 3/16* (2006.01)

(52) U.S. Cl.
CPC ............ *B60B 3/008* (2013.01); *B60B 3/10* (2013.01); *B60B 3/16* (2013.01); *B60B 2900/116* (2013.01)

(58) Field of Classification Search
USPC ................. 301/63.101, 63.103, 64.101
See application file for complete search history.

(56) References Cited

U.S. PATENT DOCUMENTS

| | | | |
|---|---|---|---|
| 7,059,685 B2 | 6/2006 | Kermelk et al. | |
| 7,104,611 B2 | 9/2006 | Alff et al. | |
| 7,878,601 B2* | 2/2011 | Kuramori | B60B 1/06 |
| | | | 301/63.101 |
| 7,922,260 B2* | 4/2011 | Rodrigues | B60B 3/002 |
| | | | 301/63.101 |
| 8,262,170 B2* | 9/2012 | Trentin | B60B 3/002 |
| | | | 301/63.103 |
| 8,398,178 B2* | 3/2013 | Kihara | B60B 3/007 |
| | | | 301/63.101 |
| 8,882,206 B2 | 11/2014 | Nakayama et al. | |
| 2005/0200193 A1* | 9/2005 | Hodges | B60B 3/005 |
| | | | 301/63.101 |
| 2005/0212350 A1* | 9/2005 | Yamamoto | B22D 15/005 |
| | | | 301/63.101 |
| 2007/0278850 A1* | 12/2007 | Rodrigues | B60B 3/002 |
| | | | 301/63.103 |
| 2010/0289323 A1* | 11/2010 | Sano | B60B 3/002 |
| | | | 301/63.103 |
| 2011/0193404 A1 | 8/2011 | Kihara et al. | |
| 2011/0193405 A1 | 8/2011 | Kihara et al. | |
| 2011/0241414 A1* | 10/2011 | Ono | B21K 1/28 |
| | | | 301/63.103 |
| 2012/0274127 A1* | 11/2012 | Kozaki | B60B 3/042 |
| | | | 301/63.103 |
| 2013/0140874 A1* | 6/2013 | Fukaya | B60B 3/005 |
| | | | 301/63.103 |
| 2013/0257139 A1 | 10/2013 | Goto | |
| 2014/0070601 A1 | 3/2014 | Morishita et al. | |
| 2016/0001592 A1* | 1/2016 | Kermelk | B60B 3/007 |
| | | | 301/64.101 |

FOREIGN PATENT DOCUMENTS

| | | |
|---|---|---|
| CN | 202283859 U | 6/2012 |
| EP | 0701911 B1 | 12/1997 |
| EP | 1262333 A2 | 12/2002 |
| EP | 1790499 A1 | 5/2007 |
| EP | 1782965 A1 | 9/2007 |
| EP | 2333451 A2 | 6/2011 |
| EP | 2495110 A1 | 9/2012 |
| EP | 2628611 A1 | 8/2013 |
| FR | 2339451 A1 | 8/1977 |
| JP | 2005507334 A | 3/2005 |
| JP | 2010132277 A | 6/2010 |
| JP | 2010132279 A | 6/2010 |
| WO | 2011055839 A1 | 5/2011 |
| WO | 2012107989 A1 | 8/2012 |
| WO | 2012153577 A1 | 11/2012 |

OTHER PUBLICATIONS

Eurasian Office Action, Application No. 201590899/31 dated Jun. 7, 2017.
Japanese Third Party Prior Art Submission, Translated in English, Application No. 2015559579, dated Jun. 22, 2017.
Japanese Notice of Reasons for Rejection, Application No. 2015559579, dated Jul. 18, 2017.

* cited by examiner

VEHICLE WHEEL FOR PASSENGER CARS

CROSS-REFERENCE TO RELATED APPLICATIONS

This application is a national stage of International Application No. PCT/IB2013/059879 filed Nov. 4, 2013, the disclosures of which are incorporated herein by reference in entirety, and which claimed priority to German Patent Application No. 20 2012 104 260.6 filed Nov. 6, 2012, the disclosures of which are incorporated herein by reference in entirety.

BACKGROUND OF THE INVENTION

The invention relates to a vehicle wheel, in particular for passenger cars, having a rim part for holding a tyre and having a disc part, which is connected to the rim part, is formed from an integral sheet metal blank by forming and cutting or punching and has a central part, which has bolt holes for wheel bolts and a central hole for a vehicle hub, and a plurality of radially extending spoke arrangements, formed by sheet metal forming, for transmitting forces between the vehicle hub and the rim part, wherein each spoke arrangement is provided with a radially extending central web, which merges on both sides into a radially extending side web, bent outwards from the surface of the central web, and an edge web, bent back again relative to the side web, wherein the radially outer ends of the central webs and of the side webs merge into an encircling annular disc rim, which is aligned precisely parallel to the axis or substantially parallel to the wheel axis and connects all the spoke arrangements to one another and is formed integrally from the metal sheet, forms the connecting part for the connection between the rim part and the disc part and, in each case together with the edge webs of adjacent spoke arrangements, delimits ventilation holes which extend over the region between the edge webs and the disc rim.

A vehicle wheel of the type in question for passenger cars is known from EP 1 262 333 A2 by the applicant and is generally referred to commercially as a "structural wheel", being marketed by the applicant under the name "VersaStyle®". By virtue of the design of the vehicle wheel, which is produced from a steel plate by forming and has relatively large-area ventilation holes, this vehicle wheel can compete not only economically, in terms of wheel weight, with aluminium wheels but also in terms of design, since, on the one hand, the vehicle wheel has an eye-catching design owing to the interplay between the spoke arrangements, which are formed several times over, and large-area ventilation holes and, on the other hand, different hubcaps can be used together with the vehicle wheel without the total weight of the vehicle wheel provided with the hubcap having any disadvantages relative to a comparable, cast aluminium vehicle wheel.

The vehicle wheel known from EP 1 262 333 A1 forms a new type of formed vehicle wheel made of steel for passenger cars, which has hitherto been produced with only five bolt holes and five spoke arrangements distributed symmetrically with respect to the bolt holes. Other manufacturers have also proposed innovations on this type of vehicle wheel, as U.S. Pat. No. 7,104,611 B2 or EP 1 790 499 A1 show, for example, in which minimal modifications to the vehicle wheel are described and which all start from such vehicle wheel as the closest prior art.

Passenger cars, in particular those of the small, compact and medium-sized category, often require vehicle wheels with 4-hole fastening. The wheel construction according to EP 1 262 333 A2 then leads to a steel vehicle wheel with four spoke arrangements, since a corresponding number of bolt holes and spoke arrangements is required in the wheel construction according to EP 1 262 333 A2.

BRIEF SUMMARY OF THE INVENTION

It is a feature of the invention to provide steel vehicle wheels on which a different number of bolt holes and spoke arrangements can be achieved without losing the significant advantages of a structural wheel of the kind described by EP 1 262 333 A2.

According to the invention, this feature is achieved by the fact that the number of spoke arrangements and the number of bolt holes is unequal, and the quotient of the number of spoke arrangements to bolt holes does not give a natural number, and that an inner annular bead and an outer annular bead are formed in the central part, which beads are concentric with one another and with the disc rim and between which a raised annular strip provided with the bolt holes is formed. In the case of the vehicle wheel according to the invention, which is produced by sheet metal forming of a steel sheet blank, an unequal number of bolt holes, on the one hand, and spoke arrangements, on the other hand, is obtained by a fundamental redesign of the central part as compared with the generic prior art, since the central part is given an inner annular bead and an outer annular bead, between which a raised annular strip is formed, in which the bolt holes are arranged. By dividing the central part, by means of the outer annular bead, from the region in which the spoke arrangements are arranged, all wheel loads can be transmitted from the rim part to the hub, despite the unequal ratio of bolt holes, on the one hand, and spoke arrangements, on the other, even though the position of a bolt hole relative to the position of the two adjacent spoke arrangements necessarily changes from one bolt hole to the next, owing to the quotient selected. The two annular beads ensure adequate reinforcement of the central part and more uniform transfer of the loads from the spoke arrangements to the central part.

The annular beads have undersides, wherein the undersides of the inner and outer annular beads preferably form the only abutment surface of the central part and of the wheel disc for abutment of the vehicle wheel on a vehicle hub. The annular beads can be designed in such a way that they are designed to run round at the same depth. However, the underside of the outer annular bead and/or the underside of the inner annular bead could be partially raised in the region of the bolt holes in order to provide an additional spring travel for self locking of the tightened wheel bolts through the deformation capacity of the annular beads in the region of the bolt holes.

The spacing between the inner annular bead and the outer annular bead is preferably smaller than twice the bolt hole diameter and preferably greater than 1.5 times the bolt hole diameter. Such a design leads to a relatively generous arrangement region for the spoke arrangements and hence allows large-area ventilation holes.

The side webs of adjacent spoke arrangements preferably each have a common starting point, a particularly advantageous possibility being for such starting point is to be situated in the outer annular bead or to merge directly into the outer annular bead. Depending on the ratio of the number of spoke arrangements to the number of bolt holes, it is advantageous in most of the variants to arrange precisely one of the bolt holes and precisely one starting point of adjacent spoke arrangements on and symmetrically with respect to a radial line. The ratio of the number of spoke arrangements to the number of bolt holes can be, in particular, 3/4, 5/4, 7/4 in the case of a vehicle wheels with four bolt holes or 4/5, 6/5, 7/5 or 8/5 in the case of vehicle wheels with five bolt holes. In an alternative embodiment, in particular in the case of a vehicle wheel with four bolt holes and six spoke arrangements, two bolt holes and two starting points of adjacent spoke arrangements can be arranged on and symmetrically with respect to a radial line. The two radial lines are then preferably in alignment and consequently form a parting plane in the vehicle wheel. In these embodiments, the valve hole for the vehicle wheel, which is arranged in the rim part, can then preferably likewise be arranged on and symmetrically with respect to a radial line on which a bolt hole and a starting point of adjacent spoke arrangements already lie.

As another preferred option, the central webs of all the spoke arrangements on a vehicle wheel according to the invention can lie at least partially in a plane which runs orthogonally to the wheel axis. On the vehicle wheels, this gives rise, over a radial partial length between the central part and the encircling disc rim, to a portion in which at least the central webs of all the spoke arrangements define a common plane. This is particularly advantageous if the side webs of all the spoke arrangements also run partially parallel to the central webs over a radial partial length at the transition to the associated edge webs, and thus define a second plane, which lies further out than the first plane.

As another preferred option, the spacing between the side webs of a spoke arrangement, i.e. the gap between two side webs of the same spoke arrangement, can initially taper continuously in the direction of the outer spoke ends from the central part, and then widen again. The maximum depth between the central web, on the one hand, and the transition from the side web into the edge web is preferably 10 mm to 30 mm, particularly in the region of extent of the ventilation holes, i.e. in the region in which ventilation holes are formed, it being particularly advantageous if the minimum depth is greater than 10 mm in the region of a radial partial length in order, by means of such a spoke depth, to achieve sufficient bending stiffness between the disc rim, on the one hand, and the region of connection of the spoke arrangements to the outer annular bead of the central part, on the other.

The front edges of the edge webs and of the central web, the front edges directly adjoining the ventilation hole, can run obliquely to the wheel axis. This can be achieved by punching the ventilation holes on the rear side. At the starting points, the converging parts of the adjacent spoke arrangements can have particularly pronounced deformations out of the zone formed by the central part, wherein these spoke origins are preferably bent out of the sheet metal blank in a manner similar to V-shaped corrugations.

Other advantages of this invention will become apparent to those skilled in the art from the following detailed description of the preferred embodiments, when read in light of the accompanying drawings.

DETAILED DESCRIPTION OF THE INVENTION

Figure 1:
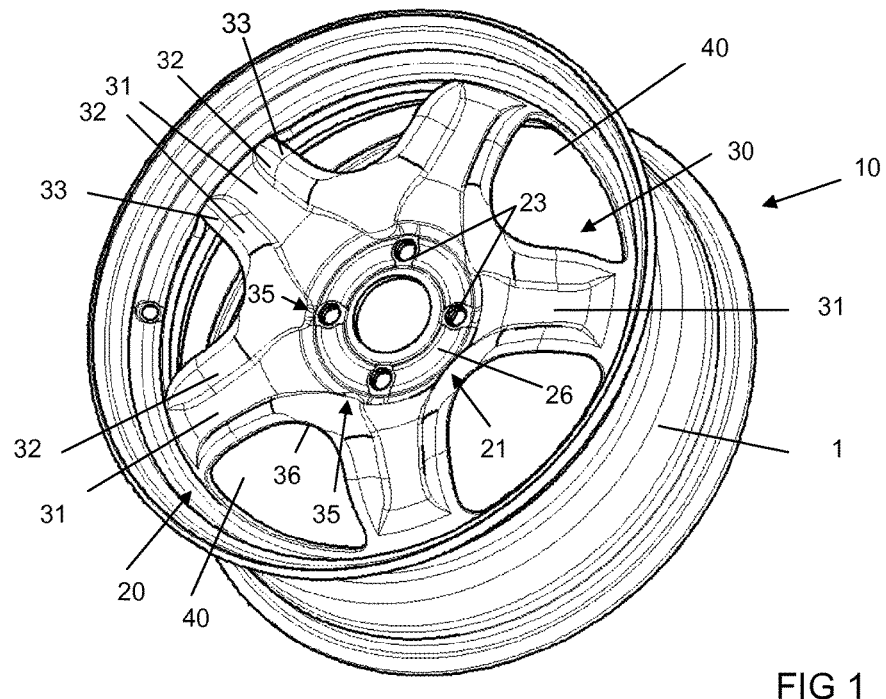
FIG. 1 shows a vehicle wheel according to the invention in a first variant embodiment in perspective view.
Figure 2:
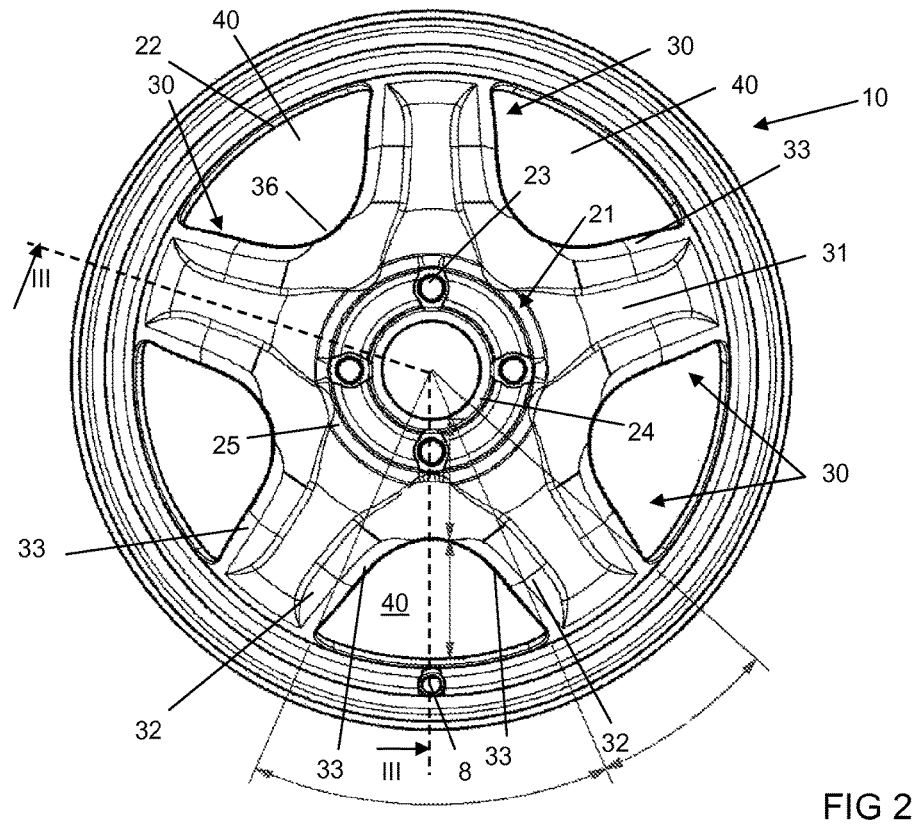
FIG. 2 shows the vehicle wheel from FIG. 1 in a plan view of the outside.
Figure 3:
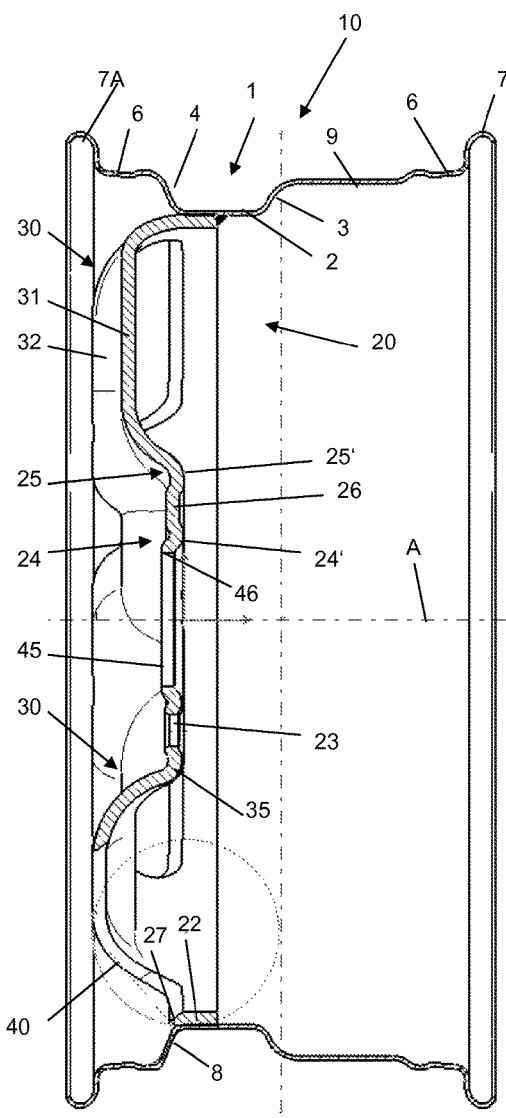
FIG. 3 shows a section along the line III-III in FIG. 2.

The vehicle wheel, denoted overall by reference sign 10 in FIGS. 1 to 3, for a passenger car having a vehicle hub with 4-hole fastening, has, in a known manner, a rim part 1, which is connected for conjoint rotation, in particular welded, to a disc part 20. The rim part 1 consists of a formed sheet steel strip, which is deformed into a ring closed by means of a weld during the forming process and is profiled in a plurality of profiling operations in such a way that, as is clearly apparent from FIG. 3, it is suitable for holding a vehicle tyre and is given a rim well 2 with well flanks 3, 4 shaped in different ways in this case, rim shoulders 6 for direct abutment of the respective tyre bead of a tyre (not shown), and rim flanges 7, 7A. With a vehicle wheel mounted, the left-hand well flank 4 in FIG. 3 faces outwards and is given a valve hole 8 to receive a vehicle valve in order to fill a mounted tyre with the necessary air pressure. Rim flange 7A accordingly forms the rim flange which lies on the outside of the wheel. By means of transitional regions 9 expanded by different amounts, the rim part 1 is given an opening width corresponding to the specifications for a particular vehicle.

The disc part 20 is likewise produced by sheet metal forming from a steel sheet, preferably by sheet metal forming of a round sheet steel blank of appropriate initial thickness. One characterizing feature of the disc part 20 on the vehicle wheel 10 is formed by the spoke arrangements 30, of which there is a total of five distributed around the circumference on the vehicle wheel 10 and which connect a central part 21 on the disc part 20 to an encircling disc rim 22 serving to connect the disc part 20 to the underside of the rim well 2 of the rim part 1. The central part 21, the spoke arrangements 30 and the encircling disc rim 22 are integral components of the disc part 20 and are produced from the same sheet metal blank by forming and punching.

The central part 21 of the disc part 20 is used to connect the vehicle wheel 10 to the vehicle hub of a vehicle with 4-hole fastening. The central part 21 accordingly has four bolt holes 23, each arranged offset by 90° to one another. All four bolt holes 23 are formed on an annular strip 26 which, as is most clearly apparent once again from FIG. 3, is bounded inwards towards the wheel axis A by an inner annular bead 24 of encircling design and towards the outside, towards the disc rim 22, by an outer annular bead 25. By virtue of the shaping of the two annular beads 24, 25, the annular strip 26 is raised relative to the underside 24' and 25' of the annular beads 24, 25 and, to this extent, is also raised slightly relative to an abutment surface, formed by the undersides 24', 25', for the disc part 20 of the vehicle wheel 1 on the vehicle hub.

Each spoke arrangement 30 has a central, radially outward-extending central web 31, which is bounded on both sides by a side web 32 bent over outwards, adjoining which there is then an edge web 33 bent back counter to the bend between the central web 31 and the side web 32, thereby giving each of the spoke arrangements 30 at least in part an approximately U-shaped cross-sectional profile with end or edge limbs that are bent away. The side webs 32, the central web 31 and, at least in part, also the edge webs 33 merge uniformly into the disc rim 22, which, in the illustrative embodiment shown, as is clearly apparent from FIG. 3, forms an encircling ring which is aligned precisely parallel to the wheel axis A and which rests on the underside of the rim well 2 and is welded on there in the region of extension of the central webs of the spoke arrangements 30. A relatively large-area ventilation hole 40 is punched out in each case between two adjacent spoke arrangements 30, wherein the disc rim 22 has, in the region in which it adjoins the respective ventilation hole 40, an oblique front edge 27, which is preferably stamped out obliquely by the punching process for the ventilation hole. At least in this region, the disc rim 22 nevertheless runs exclusively parallel to the axis without having to have a reinforcing corrugation bent over inwards one or more times. This profile of the disc rim 22 approximately precisely parallel to the axis in the region of the ventilation holes 40 is continued in the circumferential direction over a relatively large arc length of each ventilation hole 40, as far as the region in which the edge webs 33 or side webs 32 of each spoke arrangement 30 merge into the disc rim 22 and, consequently, the ventilation holes end in the circumferential direction.

It is furthermore clearly apparent from FIGS. 1 and 2 that the side webs 32 and, where relevant, the edge webs 33 of adjacent spoke arrangements 30 merge or converge with one another at the radially inner ends, wherein the two side webs 32 of adjacent spoke arrangements 30 have a common starting point 35, which either arises slightly outside the encircling outer annular bead 25 of the central part 21 or arises precisely in the annular bead 25. The two converging side webs form a ridge or corrugation that is deformed in a pronounced way towards the outside of the wheel and at the same time widens in a V-shape to the side, thereby ensuring a significant stiffening of the disc part radially to the inside of the ventilation holes. The outer annular bead 25 provides an encircling reinforcing corrugation in the central part 21 in the transitional region to the spoke arrangements 30 and to the marked deformations thereof.

In the case of the vehicle wheel 10 according to the first illustrative embodiment, there are four bolt holes 23 in the central part, and the disc part 20 simultaneously has five spoke arrangements 30. The quotient of the number of spoke arrangements 30 to the number of bolt holes 23 is consequently 5/4 or 1.25. By virtue of the five spoke arrangements, there are also five originating starting points 35 for adjacent spoke arrangements 30. One of the five starting points 35 lies on the same radial line as one of the bolt holes 23. The valve hole 8 in the rim part 1 is also arranged on the same radial line. The other starting points 35 are each offset by 72° relative to one another, for which reason different angular intervals are obtained between each starting point 35 and the adjacent bolt holes 23. The outer annular bead 25, together with the spoke structure of the individual spoke arrangements 30, nevertheless ensures that the vehicle wheel 10 has sufficient bending stiffness and torsional stiffness.

The degree of curvature of the individual spoke arrangements 30 relative to the abutment surface for the vehicle wheel 10 defined by the undersides 24', 25' of the annular beads 24, 25 and the depths to which the disc part 20 is pressed into the rim part 1 are chosen so that those zones of the outward-arching side webs 32 or edge webs 33 which are axially furthest towards the outside or project furthest towards the outside of the wheel project less far than the front sides of the outer rim flanges 7A. The forming between the central web 31 and the side webs 32 is chosen in such a way that the edge webs 33 or outer flanks of the side webs 32 are deformed relative to the central web 31 by at least 10 mm and hence by more than twice, preferably by more than three times, the initial sheet metal thickness for the disc part 20. The deformation of the individual spoke arrangements 30 is furthermore carried out in such a way that the respective central web 31 of all the spoke arrangements 30, as is once again clearly apparent from FIG. 3, is perpendicular to the wheel axis A over a radial partial length, with the result that all the central webs 31 define a common plane. The edge webs 33 or outer boundary surfaces of the side webs 32 also run parallel to the central web 32 over a radial partial length and hence all run perpendicular to the wheel axis A, thereby defining at least one second imaginary plane, wherein these two imaginary planes have an equal degree of deformation relative to one another over a radial partial length and the spoke depth is constant in this region.

Formed in the centre of the disc part 20 is a central hole 45, which, in the illustrative embodiment shown, is bounded by a central hole rim 46 extending radially relative to the inner annular bead 24. There is no outward protrusion of the central hole rim in the configuration of the vehicle wheel 10. Although the bottom edges 24', 25' of the annular beads are of encircling design, they can be slightly raised in the region of the bolt holes 23, relative to the abutment surface otherwise formed by the undersides of the annular beads 24, 25, as a result of which a certain deformation can still be introduced into the central part 21 of the vehicle wheel 10 when bolts are tightened to fix the vehicle wheel 10 on a vehicle hub, and a self-locking effect with respect to dynamic vibrations can be achieved for the individual wheel bolts.

The individual spoke arrangements 30 have a changing width over the radial length thereof from the central part 21 towards the disc rim 22. Not only do the edge webs 33 in the region immediately adjoining the individual ventilation holes 40 lie obliquely to a radial line, with the result that a spoke arrangement 30 in any case has less width in the circumferential direction at the transition to the disc rim 22 than at the point of transition (denoted by reference sign 36 in FIG. 2) between two adjacent spoke arrangements 30 in the region adjoining a ventilation hole 40, but the width of the central web 31 of each spoke arrangement 30 changes in the radial direction from the central part 21 to the disc rim 22, initially tapering in a pronounced and continuous manner from a relatively large width close to the central part 21, as is clearly apparent from the plan view in FIG. 2, then hardly tapering or remaining almost constant before increasing again in the region immediately adjoining the disc rim 22.

Figure 4:
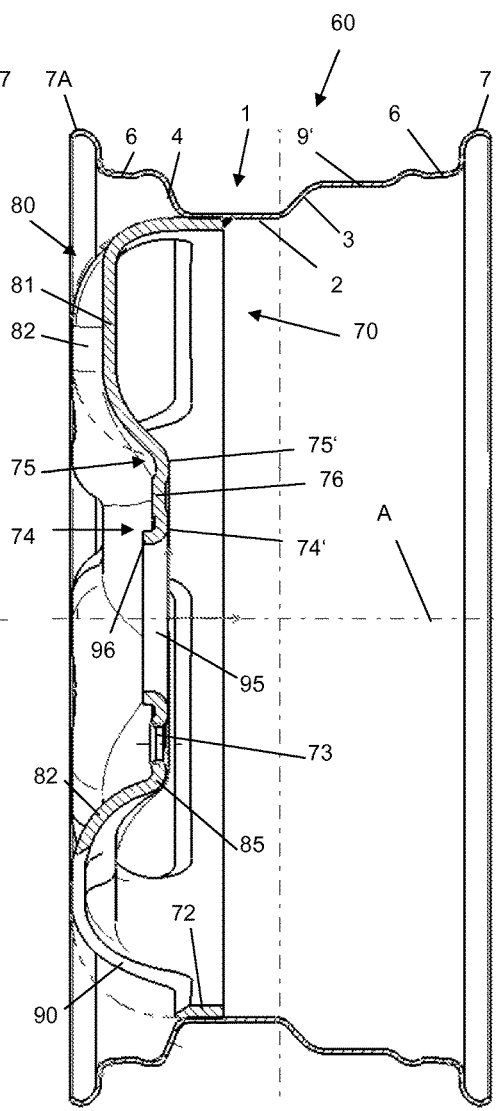
FIG. 4 shows a section similar to FIG. 3 through a vehicle wheel with a slightly modified configuration.

FIG. 4 shows a second illustrative embodiment of a vehicle wheel 60, which, like the vehicle wheel described above, can have a disc part 70 with four bolt holes 73 and five spoke arrangements 80, which have central webs 81, side webs 82 and edge webs and delimit ventilation holes 90. As in the previous illustrative embodiment, the disc rim 72 runs precisely parallel to the wheel axis A, and all the bolt holes 73 are situated in the region of an annular strip 76, which is raised relative to the undersides of an inner annular bead 74 and of an outer annular bead 75. The origins or starting points 85 of the deformations for the side webs 82 of adjacent spoke arrangements 80 are in each case situated in the region of the outer annular bead 75. Unlike the previous illustrative embodiment, however, the inner annular bead 74 in this case has the same depth over its entire encircling arc length, for which reason the underside 74' of the annular bead 74 is everywhere in an imaginary plane and hence forms an encircling abutment surface on a vehicle hub. The underside 75' of the outer annular bead 75, on the other hand, is raised slightly in the region of the bolt holes 73, as in the previous illustrative embodiment. Moreover, the central hole 95 is bounded by an annular web 96 bent over outwards, parallel to the wheel axis A.

Figure 5:
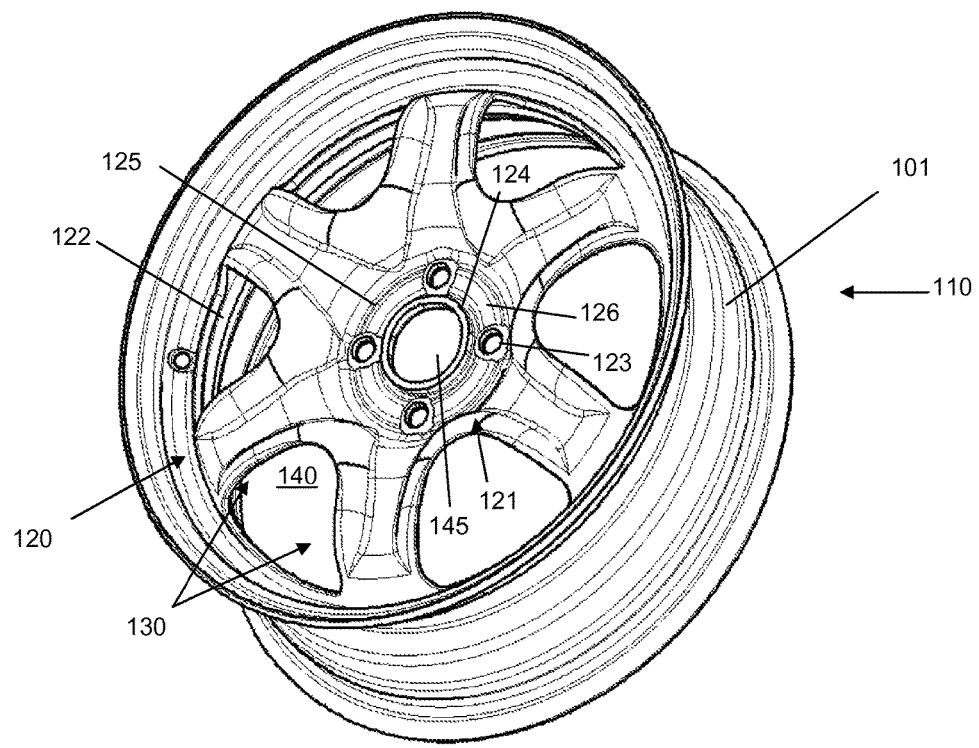
FIG. 5 shows a vehicle wheel according to a third illustrative embodiment in a perspective view.
Figure 6:
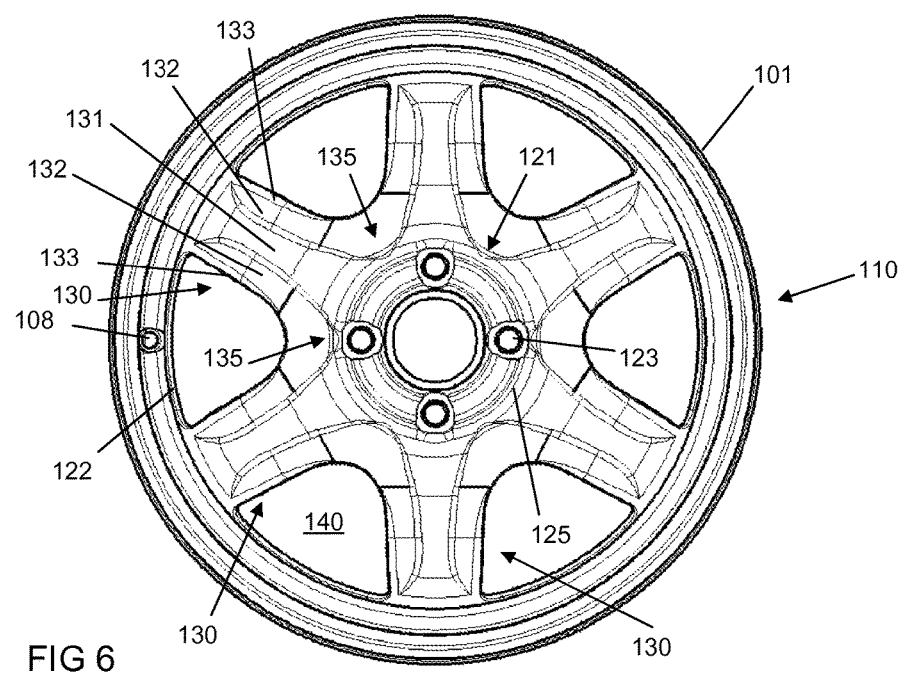
FIG. 6 shows a plan view of the front side of the vehicle wheel according to FIG. 5.
Figure 7:
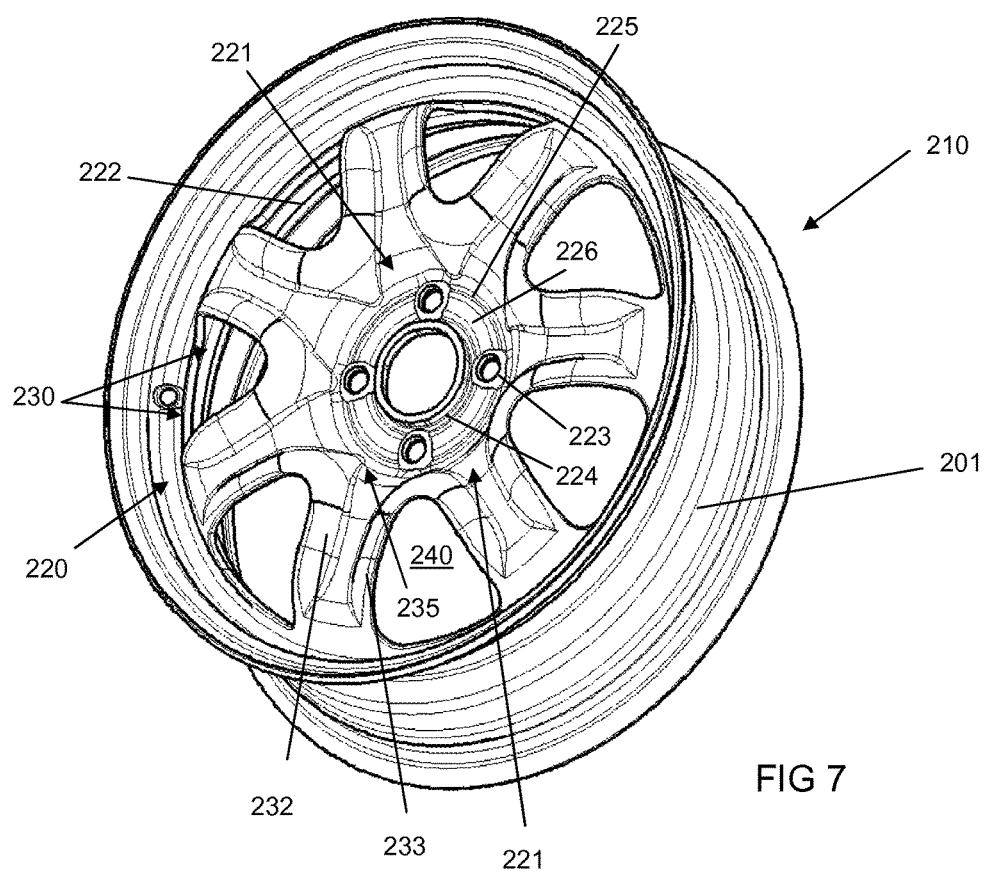
FIG. 7 shows a vehicle wheel according to a fourth illustrative embodiment.

In the case of the vehicle wheel 110 according to FIGS. 5 and 6, virtually the same rim part 101 as in the previous illustrative embodiments can be used, for which reason no details are given of the rim part 101. As in the previous illustrative embodiments, the disc part 120 has a central part 121 with four bolt holes 123 arranged in a manner distributed around the circumference on an annular strip 126, wherein the annular strip 126 is bounded on the inside, towards the central hole 145, by an inner annular bead 124 and towards the outside by an outer annular bead 125. The difference with respect to the previous illustrative embodiment consists in the number and arrangement of the spoke arrangements 130 since, on vehicle wheel 110, the disc part 120 has six spoke arrangements 130 and four bolt holes 123 in the central part 121. As in the previous illustrative embodiment, each spoke arrangement 130 has a central web 131, which merges on both sides into side webs 132 that are bent outwards and then into edge webs 133, which are bent back, which can have obliquely cut boundary edges and, together with the encircling disc rim 122, which extends very largely precisely parallel to the axis, here accordingly delimit six large-area ventilation holes 140. In each case two adjacent spoke arrangements 130 have a common origin or starting point 135 on the central part 121, which once again preferably merges integrally into the outer annular bead 125. The arrangement of the individual starting points 135 relative to the position of the bolt holes 123 is chosen in such a way that two starting points 135 in each case lie on the same radial line as one of the bolt holes 123, while the four other starting points 135 are each offset by 60° relative to the radial lines. The valve hole 108 in the rim part 101 is positioned on a radial line on which one of the bolt holes 123 and a starting point 135 also lie. The ventilation holes 140 extend as far as the disc rim 122 and thus virtually as far as the rim well of the rim part 101, less the sheet metal thickness of the disc rim 22. The quotient of the number of spoke arrangements 130 to the number of bolt holes 123 is 6/4 or 1.5.

In the fourth illustrative embodiment of a vehicle wheel 210, both the disc parts 220 and the rim part 201 once again consist of formed steel sheet. The rim part 201 has the same construction as the previous illustrative embodiment, for which reason attention is drawn to the explanations given there. Here, as a departure from the previous illustrative embodiments, the disc part 220 has a total of seven spoke arrangements 230 between the encircling disc rim 222, which is aligned parallel to the wheel axis, and the central part 221 running perpendicular to the wheel axis, wherein respectively adjacent spoke arrangements 230 converge at a common starting point 235 and, with their side webs 232 or edge webs 233, simultaneously delimit ventilation holes 240, which extend as far as the disc rim 222. The central part 121 is provided with four bolt holes 223 on a raised annular strip 226, which is bounded towards the inside by an inner annular bead 224 and towards the outside by an outer annular bead 225. Here, the quotient of the number of spoke arrangements 230 and the number of bolt holes 223 is 7/4 and consequently 1.75.

For a person skilled in the art, the preceding description will suggest numerous modifications, which should fall within the scope of protection of the attached claims. A similar configuration with an unequal ratio of bolt holes, on the one hand, and spoke arrangements, on the other hand, could also be achieved with a 5-hole fastening, in which case four, six, seven or eight spoke arrangements could then correspondingly be provided. The selected deformation depth between the central web, on the one hand, and the outermost zones of the side webs or edge webs can be greater than in the illustrative embodiments described above and may even be up to 30 mm, depending on the steel sheet used. The spacing between the inner annular bead and the outer annular bead could also be greater than twice the bolt hole diameter.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle wheel having a rim part and a disc part connected to the rim part, the disc part defining a wheel axis and having a central part having bolt holes and a central hole formed therein, the disc part having a plurality of radially extending spoke arrangements for transmitting forces between a vehicle hub and the rim part, wherein each spoke arrangement is provided with a radially extending central web, which merges on both sides thereof into a radially extending side web, bent axially outwards from a surface of the central web, and an edge web, bent back again axially relative to the side web thereby giving each of the spoke arrangements at least in part a generally U-shaped cross-sectional profile, wherein radially outer ends of the central webs and of the side webs merge into an encircling annular disc rim which connects all the spoke arrangements to one another, the encircling annular disc rim forms a connecting part for a connection between the rim part and the disc part, wherein the encircling annular disc rim and the edge webs of adjacent spoke arrangements define ventilation holes, wherein the number of spoke arrangements and the number of bolt holes is unequal, and a quotient of the number of spoke arrangements to bolt holes does not give a natural number, and wherein an inner annular bead and an outer annular bead are formed in the central part, which inner and outer annular beads are concentric with one another and with the encircling annular disc rim and between the inner and outer annular beads there is formed a raised annular strip in which the bolt holes are formed, wherein the encircling annular disc rim, over an entire axial extension thereof, is aligned parallel to the wheel axis and wherein the encircling annular disc rim in a region thereof which adjoins the ventilation hole has an oblique front edge.

2. The vehicle wheel according to claim 1, wherein the inner and outer annular beads have undersides, wherein the undersides of the inner and outer annular beads form the only abutment surface of the wheel disc for abutment of the vehicle wheel on the vehicle hub.

3. The vehicle wheel according to claim 2, wherein the underside of the outer annular bead and/or of the inner annular bead is partially raised in a region of the bolt holes.

4. The vehicle wheel according to claim 1, wherein a spacing between the inner annular bead and the outer annular bead is smaller than twice a bolt hole diameter and greater than 1.5 times the bolt hole diameter.

5. The vehicle wheel according to claim 1, wherein the side webs of adjacent spoke arrangements each have a common starting point on the central part, the starting point being situated in the outer annular bead or merging directly into the outer annular bead.

6. The vehicle wheel according to claim 5, wherein only one of the bolt holes and one starting point of the adjacent spoke arrangements are arranged on and symmetrical with respect to a radial line.

7. The vehicle wheel according to claim 6, wherein the ratio of the number of spoke arrangements to the number of bolt holes is one of 3/4, 5/4, 7/4, 4/5, 6/5, 7/5 or 8/5.

8. The vehicle wheel according to claim 5, wherein two bolt holes and two starting points of adjacent spoke arrangements are arranged on and symmetrical with respect to a radial line, wherein the vehicle wheel has four bolt holes and six spoke arrangements.

9. The vehicle wheel according to claim 6, wherein the vehicle wheel has a valve hole which is arranged on and symmetrical with respect to the radial line.

10. The vehicle wheel according to claim 1, wherein the central webs of all the spoke arrangements lie at least partial in a plane which runs orthogonally to the wheel axis.

11. The vehicle wheel according to claim 1, wherein the side webs of all the spoke arrangements run at least partially parallel to the central webs over a radial partial length at a transition to the edge webs.

12. The vehicle wheel according to claim 1, wherein the spacing between the side webs of a spoke arrangement initially tapers continuously in an outward direction starting from the central part, and then widens as the side webs extend outwardly toward an outer end of the spoke arrangement.

13. The vehicle wheel according to claim 1, wherein a maximum deformation depth defined between the central web and a transition from the side web into the edge web is 10 mm to 30 mm in a region of extent of the ventilation holes, wherein a minimum depth is greater than 10 mm in a region of a radial partial length.

14. The vehicle wheel according to claim 1, wherein front edges of the edge webs and of the central web directly adjoining the ventilation hole, run obliquely to the wheel axis.

15. The vehicle wheel according to claim 1 wherein the number of spoke arrangements is greater than the number of bolt holes.

16. The vehicle wheel according to claim 1 wherein the number of spoke arrangements is one more greater in number than the number of bolt holes.

17. The vehicle wheel according to claim 1 wherein the number of spoke arrangements is two more greater in number than the number of bolt holes.

18. The vehicle wheel according to claim 1 wherein the number of spoke arrangements is three more greater in number than the number of bolt holes.

* * * * *